(12) United States Patent
Hoelzel et al.

(10) Patent No.: US 8,562,067 B2
(45) Date of Patent: Oct. 22, 2013

(54) AIR GUIDING DEVICE FOR A MOTOR VEHICLE

(75) Inventors: Steffen Hoelzel, Eberdingen (DE); Chris Paulus, Hemmingen (DE); Gerard Nijman, Losser (NL); Mike Peeters, Vlimmeren (BE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 13/598,757

(22) Filed: Aug. 30, 2012

(65) Prior Publication Data

US 2013/0049399 A1    Feb. 28, 2013

(30) Foreign Application Priority Data

Aug. 30, 2011   (DE) .................. 10 2011 111 456

(51) Int. Cl.
*B62D 35/02*   (2006.01)

(52) U.S. Cl.
USPC ..................................... 296/180.5; 296/180.1

(58) Field of Classification Search
USPC ................................. 296/180.1, 180.3, 180.5
See application file for complete search history.

(56) References Cited

U.S. PATENT DOCUMENTS

| | | | |
|---|---|---|---|
| 4,489,806 A * | 12/1984 | Shimomura .................. 180/313 |
| 4,558,897 A | 12/1985 | Okuyama et al. |
| 4,659,130 A * | 4/1987 | Dimora et al. ............. 296/180.1 |
| 4,778,212 A * | 10/1988 | Tomforde .................. 296/180.1 |
| 4,976,489 A * | 12/1990 | Lovelace ................... 296/180.1 |
| 6,286,893 B1 * | 9/2001 | Presley ....................... 296/180.5 |
| 6,886,883 B2 * | 5/2005 | Jacquemard et al. ...... 296/180.5 |
| 6,953,218 B2 * | 10/2005 | Jungert ...................... 296/180.1 |
| 7,040,690 B2 * | 5/2006 | Soja et al. .................. 296/180.5 |
| 7,055,891 B2 * | 6/2006 | Jungert ...................... 296/180.5 |
| 7,717,494 B2 * | 5/2010 | Nagahama ................ 296/180.5 |
| 7,775,582 B2 * | 8/2010 | Browne et al. ............ 296/180.1 |
| 8,100,460 B2 * | 1/2012 | Butlin et al. ............... 296/180.1 |
| 8,292,350 B2 * | 10/2012 | Li et al. ...................... 296/180.1 |
| 2002/0093220 A1 * | 7/2002 | Borghi et al. .............. 296/180.5 |
| 2003/0116996 A1 * | 6/2003 | Soja et al. .................. 296/180.5 |
| 2004/0113457 A1 * | 6/2004 | JaCquemard et al. ..... 296/180.1 |
| 2011/0148141 A1 * | 6/2011 | Pfertner et al. ............ 296/180.3 |
| 2011/0285168 A1 * | 11/2011 | Roemer et al. ............ 296/180.5 |
| 2013/0049399 A1 * | 2/2013 | Hoelzel et al. ............ 296/180.5 |
| 2013/0057022 A1 * | 3/2013 | Hoelzel et al. ............ 296/180.5 |

FOREIGN PATENT DOCUMENTS

| | | |
|---|---|---|
| DE | 32 28 963 | 3/1983 |
| DE | 101 60 748 | 6/2003 |
| EP | 1 484 237 | 12/2004 |
| EP | 1 935 764 | 6/2008 |

* cited by examiner

*Primary Examiner* — Glenn Dayoan
*Assistant Examiner* — Gregory Blankenship
(74) *Attorney, Agent, or Firm* — Gerald E. Hespos; Michael J. Porco; Matthew T. Hespos

(57) ABSTRACT

An air guiding device for a motor vehicle has a spoiler lip (12) extending in the transverse direction (FQ) of the vehicle, and an actuating device (34) for the spoiler lip (12) in such a manner that the spoiler lip (12) is movable between a retracted rest position (RS) and an extended maximum position (MS). The spoiler lip (12) has, in the region of the longitudinal side (22) thereof which is directed toward a roadway, a flexurally elastic rod (24) that is guided movably in a guide device (26). A displacement measuring device (40) detects a position of the rod member (24).

20 Claims, 3 Drawing Sheets

AIR GUIDING DEVICE FOR A MOTOR VEHICLE

CROSS REFERENCE TO RELATED APPLICATION

This application claims priority under 35 USC 119 to German Patent Appl. No. 10 2011 111 456.8 filed on Aug. 30, 2011, the entire disclosure of which is incorporated herein by reference.

BACKGROUND OF THE INVENTION

1. Field of the Invention

The invention relates to an air guiding device for a motor vehicle, comprising a spoiler lip extending in the transverse direction of the vehicle, and an actuating device for the spoiler lip in such a manner that the spoiler lip is movable between a retracted rest position and an extended maximum position.

2. Description of the Related Art

EP 1 484 237 B1 discloses an air guiding device with a spoiler lip that extends in the transverse direction of the vehicle at the front of the vehicle. An actuating element moves the spoiler lip between a retracted rest position and an extended maximum position to optimize an intended aerodynamic effect and to optimize the output values of the motor vehicle. The actuating device of EP 1 484 237 B1 is a flexible, inflatable tube that can be filled or emptied to transfer the spoiler lip into different positions between the retracted rest position and the extended maximum position. The elastomer of the pneumatic actuators is deformed elastically during the filling operation and build up a restoring force that returns the spoiler lip back in the direction of the rest position during the emptying operation. A substantial disadvantage of the known air guiding device is that there is no feedback about the adopted position of the spoiler lip. However, the position of the spoiler lip in the driving mode should be detectable to adapt the output values of the motor vehicle optimally to the driving circumstances.

It is therefore the object to provide an air guiding device which avoids the abovementioned disadvantage.

SUMMARY OF THE INVENTION

This invention relates to an air guiding device with a displacement measuring device that detects a position of the rod. It is thereby possible in a particularly simple and cost-effective manner to obtain feedback about the position of the spoiler lip during the driving mode. The drive concept is not changed, and, owing to the rod which is already present, all that is required are additional components of the displacement measuring device. Furthermore, the displacement measuring device is protected from environmental influences and mechanical deformations and, accordingly, reliable detection can take place. A direct conclusion regarding the position of the spoiler lip is possible since the region of the longitudinal side of the spoiler lip that is directed toward the carriageway and the flexurally elastic rod member undergo an elastic expansion in length. The result is therefore an air guiding device that still functions satisfactorily even after being placed hard against a carriageway surface or after curb contact.

The displacement measuring device preferably has at least one contactless sensor and at least one magnet connected directly or indirectly to the rod. The sensor may be an inductive sensor or a Hall sensor. The magnet preferably is in a guide sleeve, and therefore the position of the magnet is defined unambiguously with respect to the sensor. The guide sleeve may be manufactured from PTFE to minimize the friction of the magnet in the guide sleeve. A spring may be provided to keep the rod under prestress in relation to a fixed housing part and thereby avoiding measuring inaccuracies due to tolerances.

The rod preferably is fixed at a first free end to a fixed housing part and is connected directly or indirectly at a second free end to the at least one magnet. This construction is simple in terms of installation and is optimized in terms of components.

In a second embodiment, the rod is fixed centrally in the guide device and each free end is connected directly or indirectly to at least one magnet. Two sensors are provided and are connected operatively to the at least one magnet. This alternative requires a more precise sensor arrangement and a greater outlay on components. However, the change in position of the rod that is to be detected is smaller, and therefore the construction space requirement of the displacement measuring device can be reduced.

The actuating device preferably is a pneumatic actuating device that has at least one inflatable actuator. In this case, a magnetic holding apparatus may be provided in the region of the free end of the spoiler lip. Control means that adjusts the spoiler lip in an infinitely variable manner between a retracted rest position and an extended maximum position can be provided to ensure optimum output values of the vehicle. Intermediate positions of the spoiler lip are set depending on the driving conditions.

An exemplary embodiment of the invention is illustrated in the drawing and is described below.

DETAILED DESCRIPTION OF THE PREFERRED EMBODIMENTS

Figure 1:
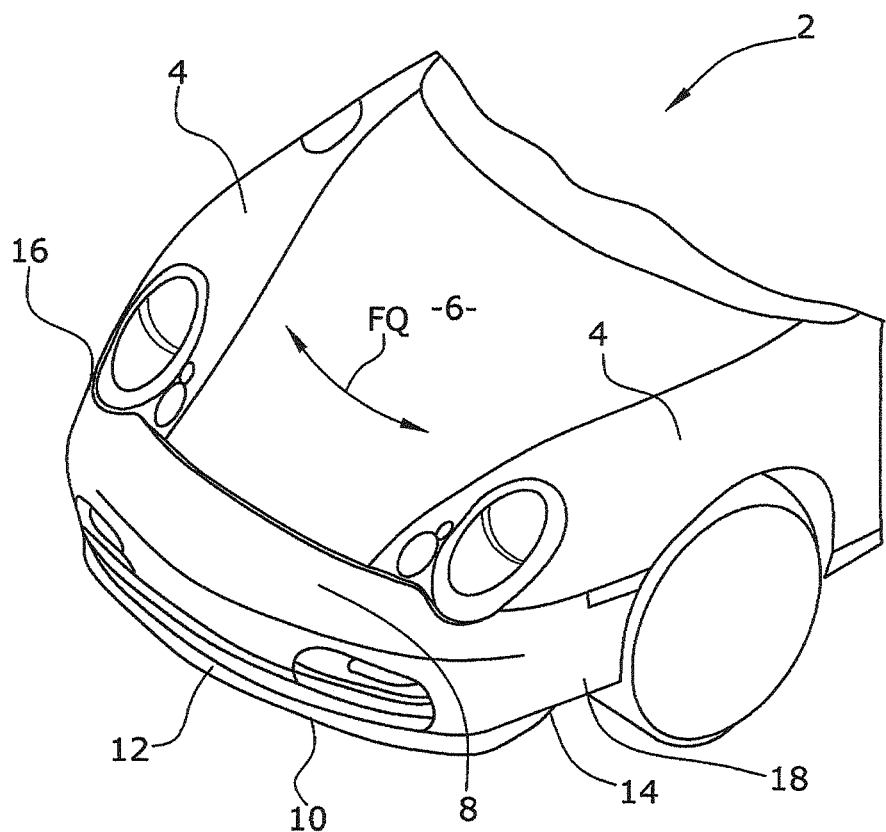
FIG. 1 shows, in a perspective view, a front region of a motor vehicle with an air guiding device according to the invention.

FIG. 1 shows a front section 2 of a motor vehicle. The front section 2 comprises lateral wings 4, an engine hood 6 arranged between the wings 4, and a front part 8 mounted in front of the engine hood 6 and the wings 4. The front part 8 forms the front end of the front portion 2 of the motor vehicle. An air guiding device 10 according to the invention, of which only a spoiler lip 12 can be seen in FIG. 1, is arranged below the front part 8. The spoiler lip 12 is in a retracted rest position RS in FIG. 1. The spoiler lip 12 extends in the transverse direction FQ of the vehicle and ends with the free ends 14, 16 thereof on the lower side of lateral longitudinal sections 18 of the front part 8.

Figure 2:
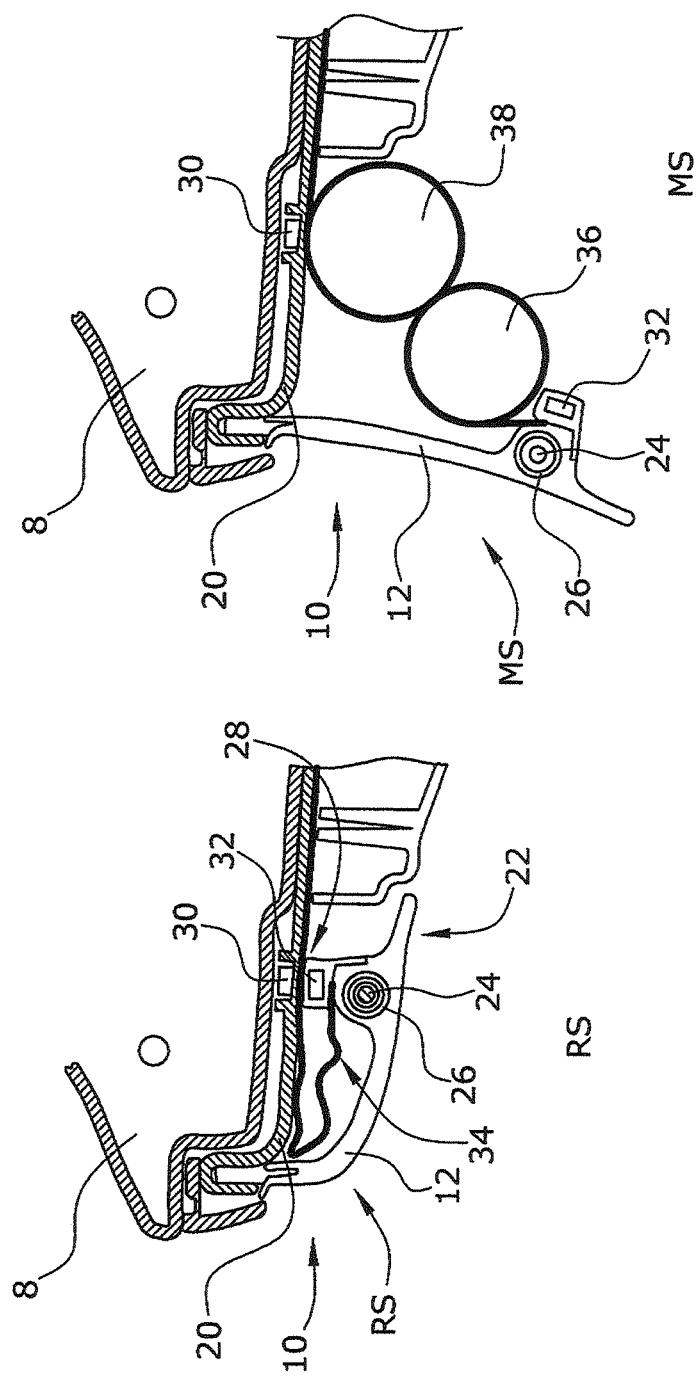
FIG. 2 shows a sectional view of the air guiding device according to the invention from FIG. 1.

FIG. 2 is a section through the front section 2 of the motor vehicle of FIG. 1 in schematic form, both in the rest position RS (on the left) and in the maximum position MS (on the right). The air guiding device 10 of the invention can be disposed at all intermediate positions between the rest position RS and the maximum position MS can be activated in an infinitely variable and optimized manner with regard to the output values of the motor vehicle. The spoiler lip 12 of the air guiding device 10 is mounted movably in an adapter plate 20 arranged on the lower side of the front part 8. The region of the longitudinal side 22 of the spoiler lip 12 that is directed towards a roadway (not illustrated) has a flexurally elastic rod 24 that is guided movably in a guide device 26. In the present exemplary embodiment, the guide device 26 is a weather strip extending over the entire length of the spoiler lip, but the guide device 26 could be constructed from subsections injected into the spoiler lip 12. The rod 24 preferably is PTFE, PTFE-encased GFRP or of a different plastic to be able to be guided in the guide device 26 with minimum static friction and sliding friction.

A holding apparatus 28 is provided to mount the spoiler lip 12 securely in the retracted rest position even in the event of shaking and an uneven roadway profile. The holding apparatus has a first magnet 30 mounted in the adapter plate 20 and a second magnet 32 arranged in the spoiler lip 12.

An actuating device 34 is provided for moving the spoiler lip 12 between the retracted rest position RS and the extended maximum position MS. The actuating device 34 preferably is a pneumatic actuating device 34, which is known per se, and comprises actuators 36, 38 that can be filled with/emptied of air.

A displacement measuring device 40 (FIGS. 3 and 4) is provided to detect a position of the rod 24 and hence the current position of the spoiler lip 12, even in any intermediate position, and to provide feedback to a vehicle controller, and therefore also to the driver, about whether the aerodynamically envisaged output values are achieved.

Figure 3:
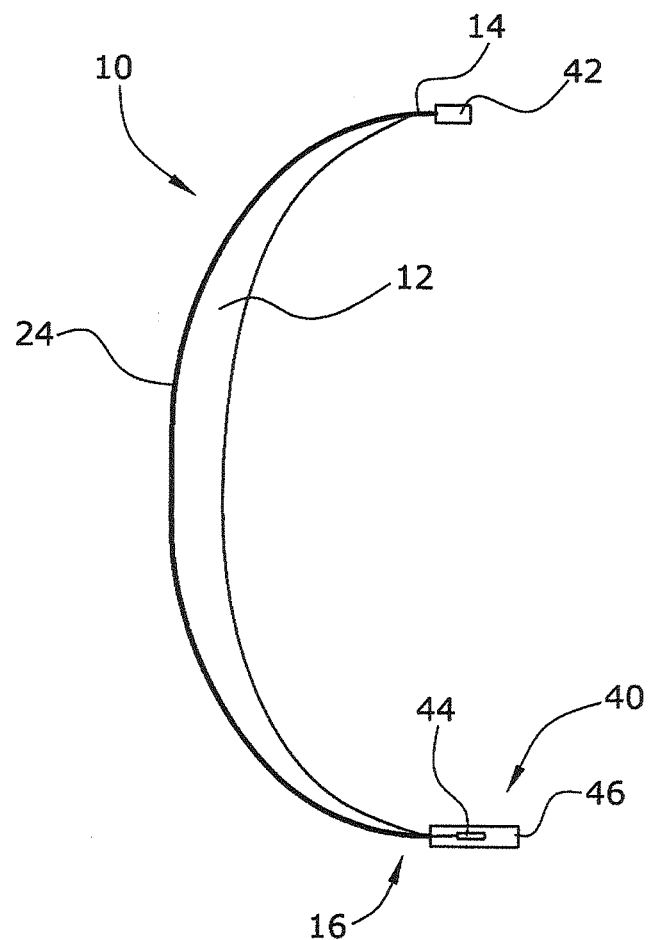
FIG. 3 shows a view from below of the air guiding device according to the invention from FIG. 1.

FIG. 3 shows the lower side of the air guiding device 10 with the spoiler lip 12 extended. The view illustrates a rod 24 at the extended maximum position MS and pulled to the maximum distance out of a guide sleeve 46. The rod 24 undergoes only minimal expansion in length, if any at all. The rod 24 has a first end 14 connected fixedly to the front part 8 by a fastener 42 and a second free end 16 that interacts with the displacement measuring device 40. For this purpose, the rod 24, as illustrated in FIG. 4, is connected to a magnet 44 that is mounted movably in the guide sleeve 46.

According to a second embodiment of the air guiding device 2, the rod 24 is fixed centrally in the guide device 26, and each free end 14, 16 is connected directly or indirectly to a magnet 44 and operatively connected to relevant sensors.

Figure 4:
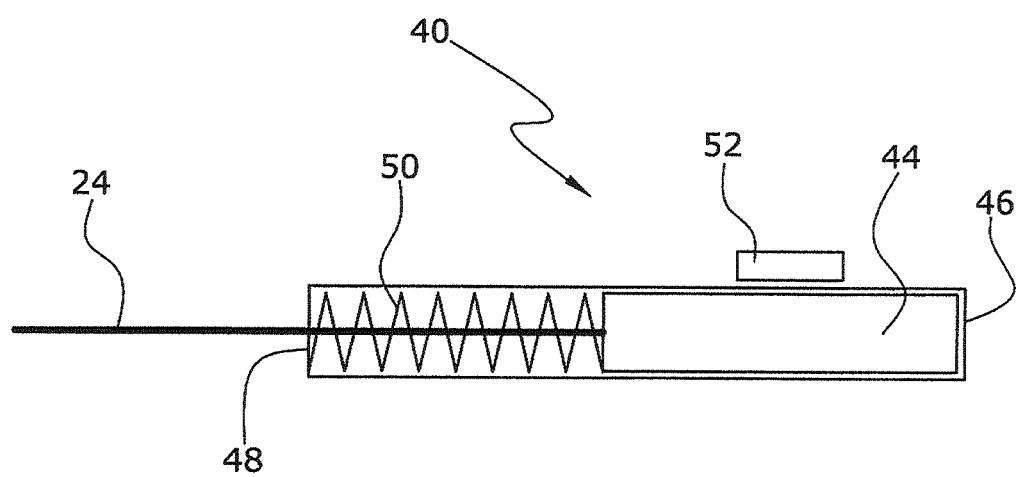
FIG. 4 is a detailed view of a displacement measuring device for the air guiding device according to the invention from FIG. 1.

FIG. 4 is a detailed view of the displacement measuring device 40. The rod 24 is connected directly to a magnet 44 mounted movably in the guide sleeve 46. The guide sleeve 46 is arranged on a fixed housing part, here the lateral longitudinal section 18 of the front part 8. A restoring spring 50 is arranged between the magnet 44 and an end 48 of the guide sleeve 46 and keeps the rod 24 continuously under prestress. Furthermore, the displacement measuring device has an inductive sensor 52 that detects the position of the magnet 44. FIG. 4 shows the rod 24 and the spoiler lip 12 in the retracted rest position RS. If the spoiler lip 12 is extended, a longitudinal force acts on the 24 and the magnet 44 is moved in the direction of the stop end 48. It is thereby possible to detect all positions between the retracted rest position RS and the extended maximum position MS in an infinitely variable manner and to be able to convey the positions to a control unit (not illustrated specifically) by means of corresponding control means.

What is claimed is:
1. An air guiding device for a motor vehicle, comprising:
 a spoiler lip extending in a transverse direction of the vehicle;
 an actuating device operative for moving the spoiler lip between a retracted rest position and an extended maximum position;
 a flexurally elastic rod on a longitudinal side of the spoiler lip directed toward a roadway, the rod being guided movably in a guide device; and
 a displacement measuring device that detects a position of the rod, the displacement measuring device having at least one contactless sensor and at least one magnet connected directly or indirectly to the rod and the at least one magnet being arranged in a guide sleeve.

2. The air guiding device of claim 1, wherein the sensor is an inductive sensor or a Hall sensor.

3. The air guiding device of claim 1, wherein the guide sleeve is manufactured from plastic.

4. The air guiding device of claim 1, wherein the actuating device is a pneumatic actuating device with at least one inflatable actuator.

5. The air guiding device of claim 1, wherein a holding apparatus is provided in the region of the free end of the spoiler lip.

6. The air guiding device as claimed in claim 5, wherein the holding apparatus is a magnetic holding apparatus.

7. The air guiding device of claim 1, further comprising control means for adjusting the spoiler lip in an infinitely variable manner between a retracted rest position and an extended maximum position.

8. An air guiding device for a motor vehicle, comprising:
 a spoiler lip extending in a transverse direction of the vehicle;
 an actuating device operative for moving the spoiler lip between a retracted rest position and an extended maximum position;
 a flexurally elastic rod on a longitudinal side of the spoiler lip directed toward a roadway, the rod being guided movably in a guide device;
 a spring disposed so that the rod is under prestress in relation to a fixed housing part; and
 a displacement measuring device that detects a position of the rod.

9. The air guiding device of claim 8, wherein the displacement measuring device comprises an inductive sensor or a Hall sensor.

10. The air guiding device of claim 8, wherein the actuating device is a pneumatic actuating device with at least one inflatable actuator.

11. The air guiding device of claim 8, wherein a holding apparatus is provided in the region of the free end of the spoiler lip.

12. The air guiding device as claimed in claim 11, wherein the holding apparatus is a magnetic holding apparatus.

13. The air guiding device of claim 8, further comprising control means for adjusting the spoiler lip in an infinitely variable manner between a retracted rest position and an extended maximum position.

14. An air guiding device for a motor vehicle, comprising:
 a spoiler lip extending in a transverse direction of the vehicle;
 an actuating device operative for moving the spoiler lip between a retracted rest position and an extended maximum position;
 a flexurally elastic rod on a longitudinal side of the spoiler lip directed toward a roadway, the rod being guided movably in a guide device; and
 a displacement measuring device that detects a position of the rod, the displacement measuring device having at least one contactless sensor and at least one magnet, wherein the rod has a first end fixed to a fixed housing part and a second end connected directly or indirectly to the at least one magnet.

15. The air guiding device of claim 14, wherein the at least one magnet is arranged in a guide sleeve.

16. The air guiding device of claim 14, wherein the sensor is an inductive sensor or a Hall sensor.

17. The air guiding device of claim 14, wherein the actuating device is a pneumatic actuating device with at least one inflatable actuator.

18. The air guiding device for a motor vehicle, comprising:
a spoiler lip extending in a transverse direction of the vehicle;
an actuating device operative for moving the spoiler lip between a retracted rest position and an extended maximum position;
a flexurally elastic rod on a longitudinal side of the spoiler lip directed toward a roadway, the rod being guided movably in a guide device; and
a displacement measuring device that detects a position of the rod, the displacement measuring device having first and second contactless sensors and first and second magnets, wherein the rod has a central part fixed in the guide device, and first and second free ends respectively connected directly or indirectly to the first and second magnets, the first and second sensors being operatively connected respectively to the first and second magnets.

19. The air guiding device of claim 18, wherein the sensors are inductive sensors or Hall sensors.

20. The air guiding device of claim 18, wherein the actuating device is a pneumatic actuating device with at least one inflatable actuator.

* * * * *

UNITED STATES PATENT AND TRADEMARK OFFICE
CERTIFICATE OF CORRECTION

PATENT NO.         : 8,562,067 B2
APPLICATION NO.    : 13/598757
DATED              : October 22, 2013
INVENTOR(S)        : Steffen Hoelzel et al.

It is certified that error appears in the above-identified patent and that said Letters Patent is hereby corrected as shown below:

Title Page: Item (73) Assignees should read:   Dr. Ing. h.c.F. Porsche Aktiengesellschaft (DE)
Apollo vredestein B.V. (NL)

Signed and Sealed this
Twelfth Day of August, 2014

Michelle K. Lee
*Deputy Director of the United States Patent and Trademark Office*